US010679197B1

United States Patent
Gantert et al.

(10) Patent No.: US 10,679,197 B1
(45) Date of Patent: Jun. 9, 2020

(54) SYSTEMS AND METHODS FOR PERFORMING PAYMENT INTERFACE

(71) Applicant: JPMorgan Chase Bank, N.A., New York, NY (US)

(72) Inventors: Brian Gantert, Hockessin (DE); Brent Samuels, Avondale, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 1354 days.

(21) Appl. No.: 14/587,770

(22) Filed: Dec. 31, 2014

(51) Int. Cl.
*G06Q 20/10* (2012.01)
*G06Q 20/18* (2012.01)
*G06Q 20/32* (2012.01)

(52) U.S. Cl.
CPC ......... *G06Q 20/18* (2013.01); *G06Q 20/3278* (2013.01)

(58) Field of Classification Search
CPC ...... G06Q 40/025; G06Q 40/00; G06Q 40/02; G06Q 40/04; G06Q 20/10; G06Q 20/18; G06Q 20/40; G06Q 20/102; G06Q 20/3278; G06Q 30/02; G06Q 30/04; G06Q 30/06
USPC .................................................. 705/35–44
See application file for complete search history.

(56) References Cited

U.S. PATENT DOCUMENTS

| 2013/0246171 A1* | 9/2013 | Carapelli ........... G06Q 20/3278 705/14.51 |
| 2014/0006184 A1* | 1/2014 | Godsey ................. G06Q 20/08 705/44 |
| 2015/0248702 A1* | 9/2015 | Chatterton ......... G06Q 30/0261 705/14.58 |

* cited by examiner

*Primary Examiner* — Hani M Kazimi
(74) *Attorney, Agent, or Firm* — Hunton Andrews Kurth LLP

(57) ABSTRACT

The invention provides systems and methods directed to a user device that provides an IA (interface assistance) visual displayed on the user device, the user device including a computer processor operably connected to a non-transitory memory portion, the user device for use by a human user. The user device comprising (1) the computer processor; (2) the memory portion; (3) a communication element; (4) an electronic visual display; (5) a payment portion integrated with the computer processor, the payment portion performs payment processing; (6) an IA (interface assistance) portion integrated with the computer processor, the IA portion providing assistance in conjunction with performing a financial transaction using the user device, the IA portion performing processing including: (a) inputting a request for interface assistance; (b) performing processing based on the request to determine an IA (interface assistance) visual, content of the IA visual related to the communication element of the user device; and (c) outputting the IA visual to the electronic visual display of the user device; and (7) the electronic visual display displaying the IA visual in such manner that the IA visual is observable by the user, the content of the displayed IA visual being correlated with the physical position of the communication element in the user device.

12 Claims, 12 Drawing Sheets

Fig. 9

780 Payment portion 140 and IA portion 150 interface with user to complete requested payment (from Fig. 4)

781

782 Interactively display components of the IA visual on phone (see related step 760' of Fig. 5)

782-1 Provide progressive graphics - IA visual changes as user advances through transaction 782-2 Provide dynamic graphics - IA visual changes as the status of the phone changes (e.g. user changes the orientation of the phone)

783 Adjust settings associated with payment portion 140 and/or IA portion 150

Processing may be associated with light indicator that changes red, yellow, green e.g. as user more accurately positions phone Process returns to Fig. 4 (step 790)

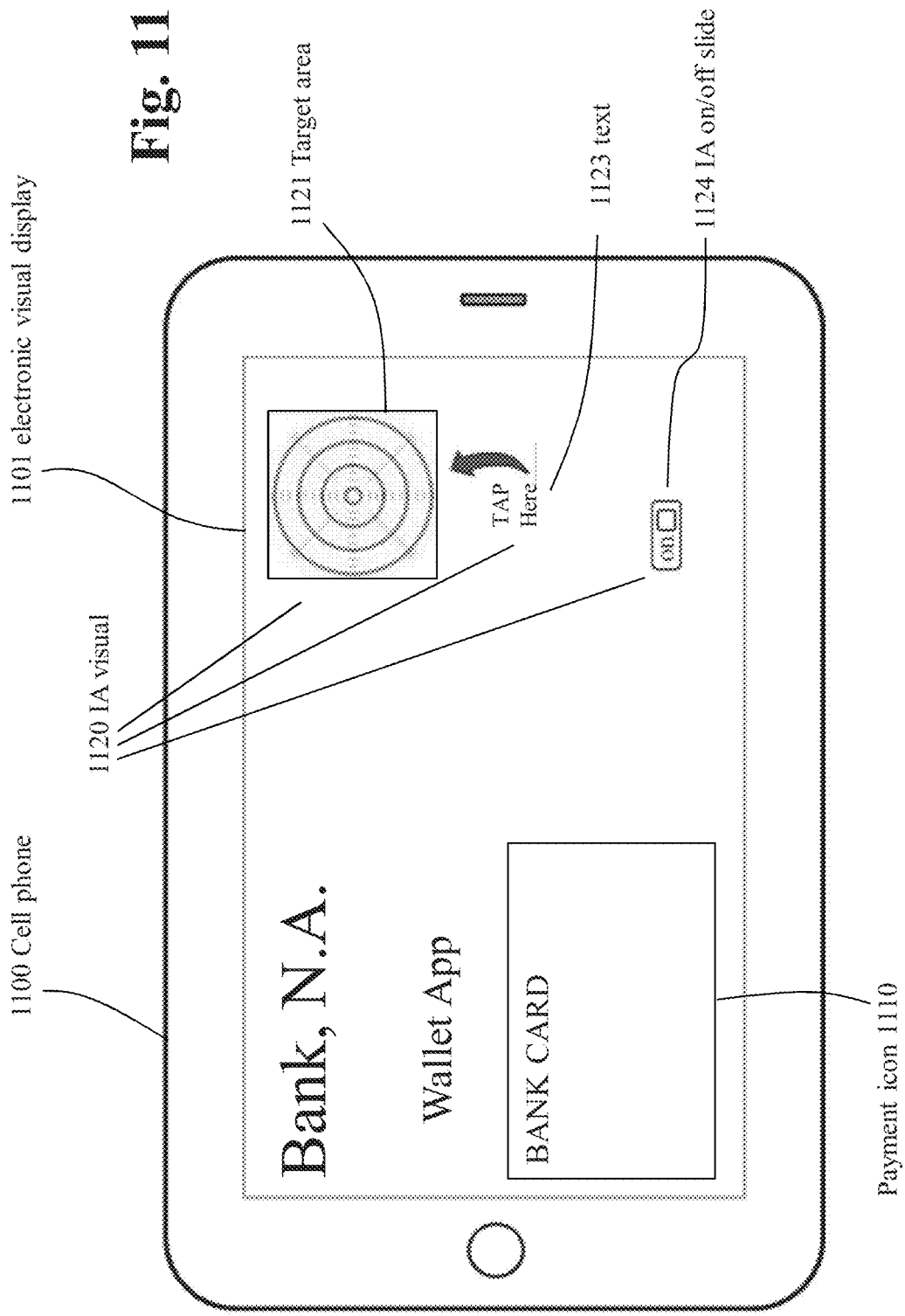

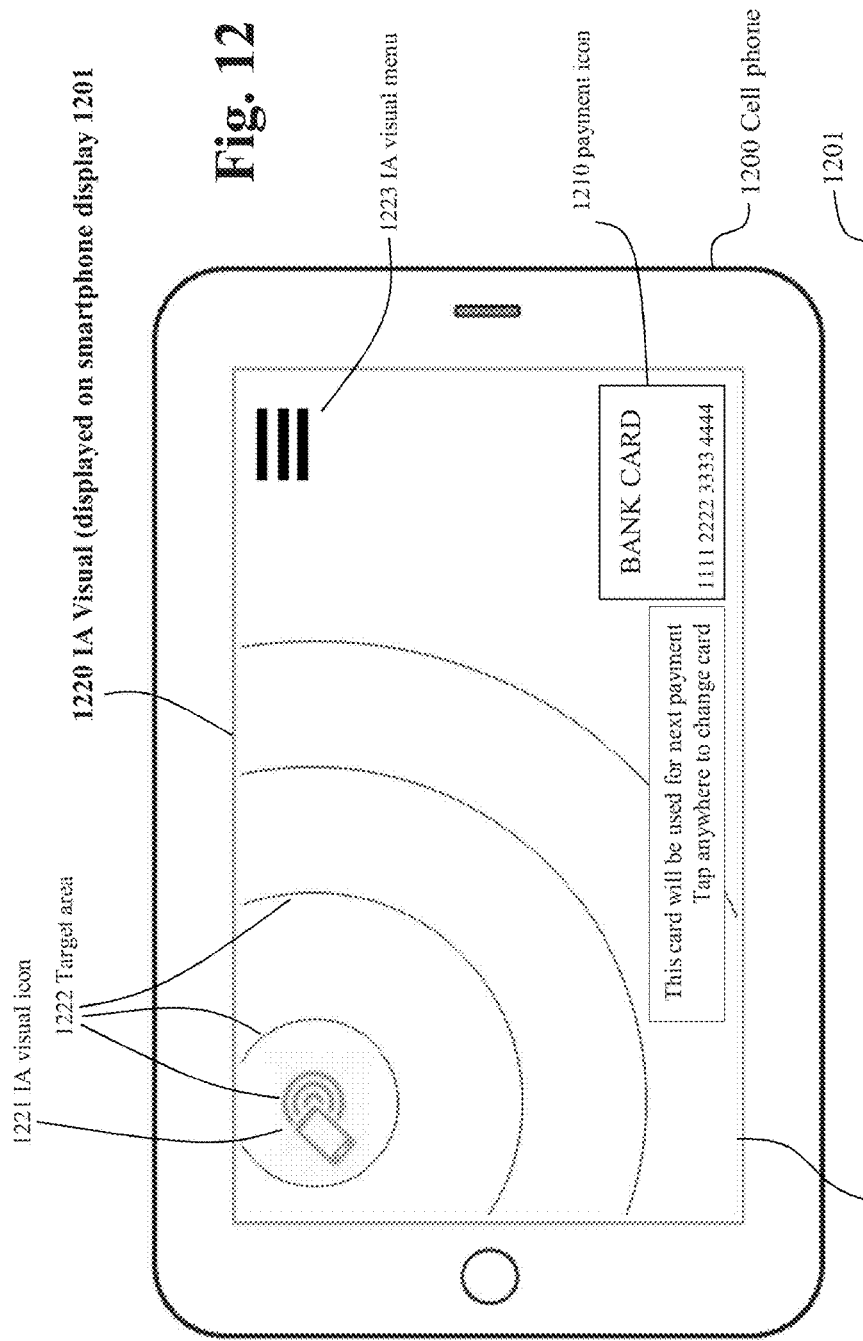

SYSTEMS AND METHODS FOR PERFORMING PAYMENT INTERFACE

FIELD OF THE INVENTION

The systems and methods of the invention relate to mobile payments and related technologies.

BACKGROUND OF THE INVENTION

Mobile banking is prevalent with a wide variety of user devices including smartphones. An aspect of mobile banking is performing transactions between a user device and a point of sale (POS) at a merchant location. Such processing might include a smartphone interfacing with an NFC terminal at a merchant location.

While there are various known technologies related to such mobile banking, such technology is lacking. The invention addresses shortcomings of such known technology.

SUMMARY OF THE INVENTION

The invention provides systems and methods directed to a user device that provides an IA (interface assistance) visual displayed on the user device, the user device including a computer processor operably connected to a non-transitory memory portion, the user device for use by a human user. The user device comprising (1) the computer processor; (2) the memory portion; (3) a communication element; (4) an electronic visual display; (5) a payment portion integrated with the computer processor, the payment portion performs payment processing; (6) an IA (interface assistance) portion integrated with the computer processor, the IA portion providing assistance in conjunction with performing a financial transaction using the user device, the IA portion performing processing including: (a) inputting a request for interface assistance; (b) performing processing based on the request to determine an IA (interface assistance) visual, content of the IA visual related to the communication element of the user device; and (c) outputting the IA visual to the electronic visual display of the user device; and (7) the electronic visual display displaying the IA visual in such manner that the IA visual is observable by the user, the content of the displayed IA visual being correlated with the physical position of the communication element in the user device.

BRIEF DESCRIPTION OF THE DRAWINGS

The invention can be more fully understood by reading the following detailed description together with the accompanying drawings, in which like reference indicators are used to designate like elements, and in which:

FIG. 9 is a flow chart showing in further detail the "payment portion 140 and IA portion 150 interface with user to complete requested payment" step 780 of FIG. 4 in accordance with one embodiment of the invention.

FIG. 11 is a diagram showing a user device with an IA visual in accordance with one embodiment of the invention.

FIG. 12 is a further diagram showing a user device with an IA visual in accordance with one embodiment of the invention.

DETAILED DESCRIPTION OF PREFERRED EMBODIMENTS

Figure 1:
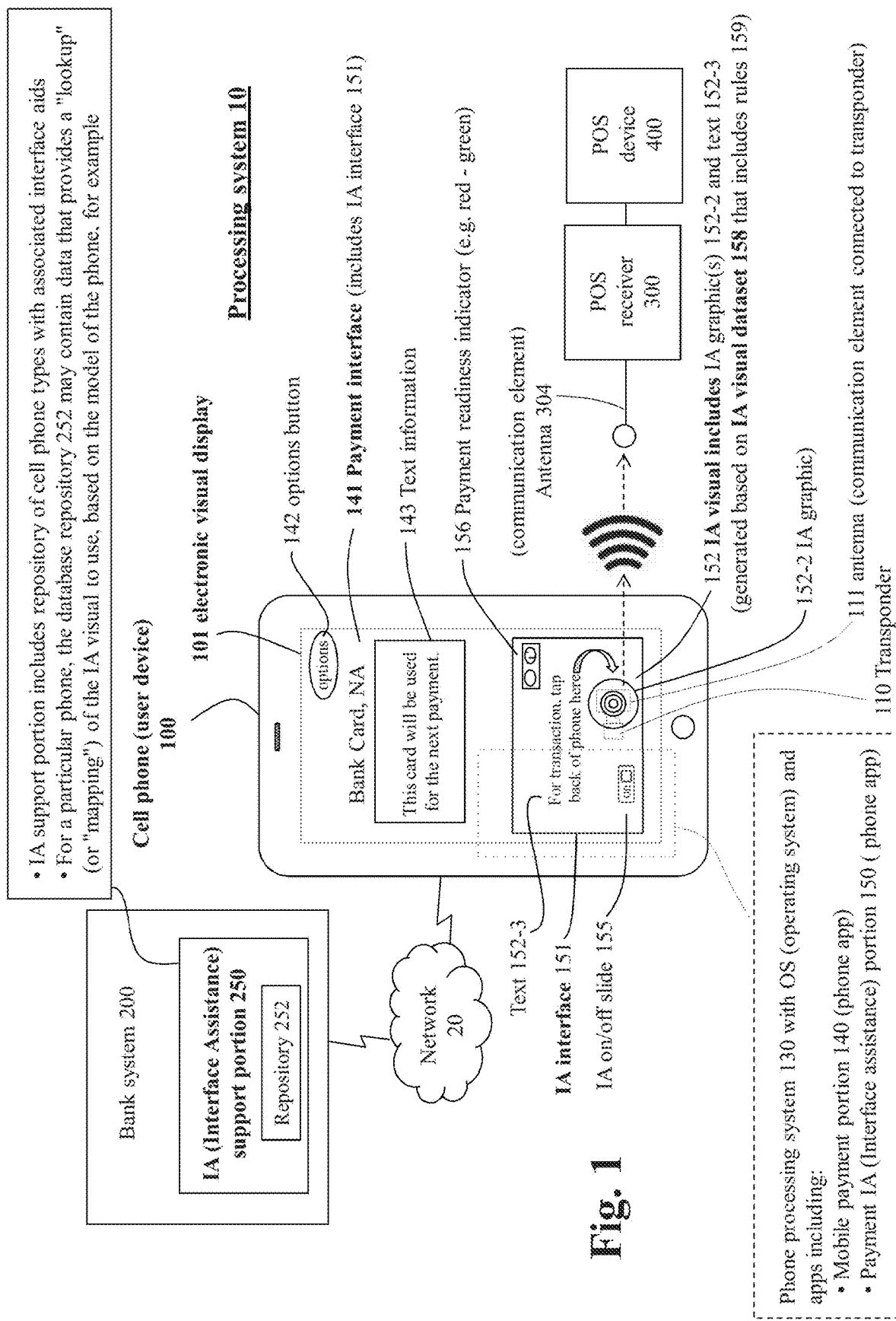
FIG. 1 is a block diagram showing a processing system in accordance with one embodiment of the invention.

Hereinafter, methods and systems in accordance with various embodiments of the invention will be described. As used herein, any term in the singular may be interpreted to be in the plural, and alternatively, any term in the plural may be interpreted to be in the singular.

The systems and methods of the invention are directed to processing to provide interface assistance in the environment of payment processing. In particular, the invention is directed to providing interface assistance in the context of performing payment processing using a mobile user device, such as a smartphone or cellular phone.

In accordance with one aspect of the invention, problems exist when users, i.e., customers, are new to a particular phone and/or new to a particular form of payment. The user may have trouble determining the proper manipulation of the phone in order to best effect a payment. For example, the user often has trouble determining the optimal way to hold the phone to properly complete a transaction, such as an NFC transaction. In accordance with aspects of the invention, problems exist in customers working with a wide variety of payment types, methodologies and accounts, for example. In particular, problems may exist for customers in effectively using the wide variety of payment types available via phone apps and cloud based payments, for example. In particular, the customer may have trouble determining when a payment is "ready to go" when interfacing with a particular payment terminal or type.

Such problems for customers are exacerbated given the breadth of new device manufacturers, device sizes (e.g. phone, smartphone, tablets, fobs, wearables such as watches), operating systems (e.g. android, Windows, IOS), and the particulars of various types of transactions, such as for example NFC and RFID payments. In particular, this problem exists with NFC payments given the spatial relationship needed to perform a transaction, i.e., which may be as little as 1 to 2 inches needed between the NFC terminal or endpoint vis-à-vis the antenna of the cell phone.

Accordingly, the systems and methods of the invention, in accord with one aspect of the invention, incorporate a visual element characterized herein as an IA (Interface Assistant) visual into a mobile payment platform, with the IA visual highlighting the location of the antenna for a specific mobile device. It is appreciated that the invention is not limited to NFC communications in particular. Rather, the invention may provide assistance in positioning a user device to perform a variety of payment types with a variety of payment platforms. Also, the invention is not limited to assisting in the positioning of an antenna of a user device. Rather, the invention may assist in the positioning of various other communication elements (disposed within a user device or associated with the user device), i.e., other than an antenna.

By providing a visual of the location of an antenna, such as a visual of the location of an NFC antenna, the user is provided information regarding how to hold and/or position her phone to best complete a transaction. The invention may provide a repository of enabled phones with each phone's respective corresponding communication element location. For example, the invention may provide a repository of all NFC enabled phones with each phone's respective corresponding antenna location.

The antenna visual, or more generally "IA visual" as characterized herein may be displayed as an overlay to a payment platform at or during the time of the user making a purchase (using the payment platform on her phone). Accordingly, if the payment platform being utilized is constituted by a wallet, then the visual may be displayed as an overlay to such wallet—as presented on the phone of the user. The IA visual may be displayed in some automated manner during the course of performing a purchase. For example, the IA visual might be generated based on some predetermined trigger event. Such predetermined event might be constituted by and/or relate to: selection of a particular card on the user's phone, selection of a particular wallet on the user's phone, selection of a particular payment platform, upon the user device being positioned at a particular orientation such as vertical or horizontal, the selection of a particular button or item on the phone, and/or the selection of a help option, for example. The user may be provided the ability to adjust various rule settings associated with the IA visual processing. For example, rules that relate to when the IA visual is displayed and/or how the IA visual is displayed may be set by the user through some suitable interface.

In accord with a further aspect of the invention, it is appreciated that the solution described herein may also be used and/or be paired with a sensor on a POS terminal, such as an NFC proximity sensor. The NFC proximity sensor (or other proximity sensor) may be provided to help guide a user (in positioning her phone) to the proximity of an NFC terminal based on the strength of the signal. For example, an element in the cell phone and/or an element in the NFC terminal may identify the proximity (or lack of proximity) of the antenna of the cell phone vis-à-vis the NFC terminal—and provide feedback to the user of the cell phone. Such feedback may be provided to allow the user to adjust the position of the cell phone vis-à-vis the NFC terminal.

Hereinafter, systems and methods of the invention will be described with reference to the various drawings.

FIG. 1 is a block diagram showing a processing system 10 in accordance with one embodiment of the invention. FIG. 1 might be characterized as illustrating a point of sale architecture inclusive of a user device 100. The user device 100 is illustrated as a cell phone, for example.

The cell phone 100 of FIG. 1 includes a phone processing system 130, i.e., an operating system (OS). The phone processing system 130 might be constituted by an Android OS, a Windows OS, or a iOS, for example. The cell phone 100 may also include a variety of applications, i.e. "apps." As related to the systems and methods of the present invention, the apps disposed on the cell phone 100 may include a mobile payment app and an IA (interface assistance) app. Such two apps are respectively characterized herein as a mobile payment portion 140 and a payment IA portion 150. Such characterization reflects that the mobile payment portion 140 and the payment IA portion 150 need not necessarily be constituted by an "app." Rather, such processing portions may alternatively be constituted by any suitable processing component of the cell phone 100 (or other user device), such as by being integrally disposed with the processing system 130, i.e., with the OS of the user device 100. It is appreciated that apps, applications, and/or other processing components described herein may well be updated periodically, such as by downloading new updates from a suitable app store or application store, for example.

The cell phone 100 includes an electronic visual display 101, i.e., a display 101. The display 101 displays images thereon so as to interface with the user of the cell phone 100. The display 101 may also be touch sensitive—so as to interface with the user.

Figure 2:
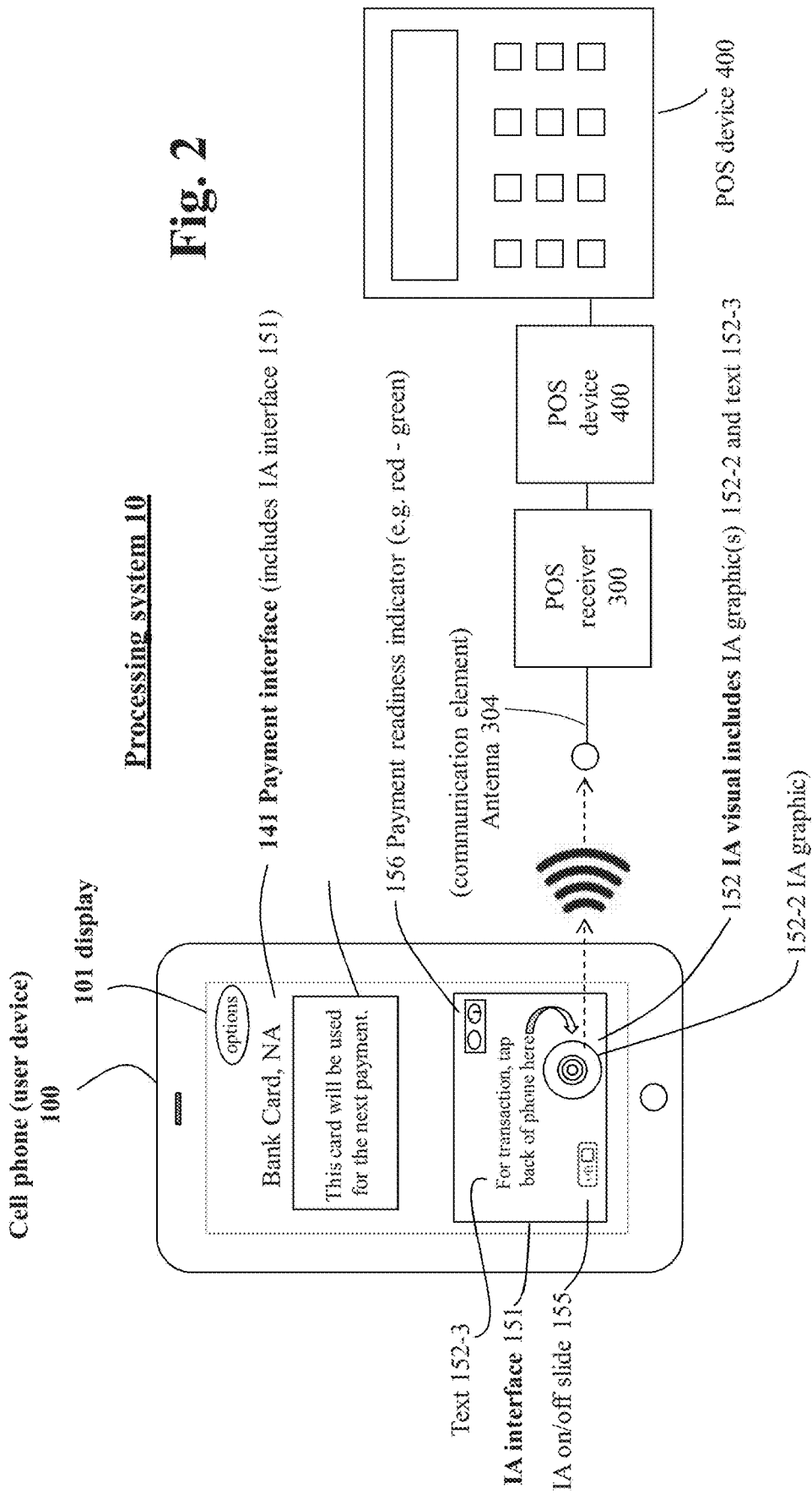
FIG. 2 is a block diagram showing aspects of the processing system of FIG. 1 in further detail, in accordance with one embodiment of the invention.

FIG. 2 is a block diagram showing aspects of the processing system 10, of FIG. 1 in further detail, in accordance with one embodiment of the invention. In particular, FIG. 2 is directed to the user device 100 and the POS (300, 400)—omitting other details of FIG. 1.

As shown in FIG. 1 and FIG. 2, the mobile payment portion 140 generates a payment interface 141 on the display 101. Illustratively, the payment interface 141 may include a variety of items including text information 143, an options button 142, various icons, and/or a variety of other items as may be desired. The mobile payment portion 140 is provided on the cell phone 100 to allow payment processing using the cell phone 100. For example, such payment processing might be constituted by the cell phone 100 interfacing with an NFC terminal and merchant POS (300, 400). Such features are described in further detail below.

Of particular relevance to the systems and methods of the invention, FIG. 1 shows an IA (Interface Assistance) interface 151 displayed on the display 101 of the cell phone 100. The IA interface 151 is generated by the payment IA portion 150. As shown, the IA interface 151 may constitute a part of the payment interface 141 and/or be integrated in some manner with the payment interface 141. However, the invention also contemplates display of only the IA interface 151. That is, the IA interface 151 may be displayed without the payment interface 141—or in some other manner separately vis-à-vis the payment interface 141. Relatedly, the payment IA portion 150 may perform processing and run independently from the payment portion 140, in accordance with embodiments of the invention.

The IA interface 151 includes an IA visual 152. The IA visual 152 contains content to assist a user in physically positioning his or her phone to successfully make a payment, such as to make an NFC payment. In particular, the IA visual 152 includes an IA graphic 152-2. The IA graphic 152-2 might be in the form of a "bulls-eye" displayed to the user on the display 101. Such bulls-eye is physically disposed over the antenna 111 of the cell phone 100 in accordance with one embodiment of the invention. The IA graphic 152 may be accompanied by text 152-3 that instructs the user to position the bulls-eye (as displayed on her phone) over an NFC antenna 304 or over some other POS communication element as may be the case. For example, the text might clarify some aspect of the positioning, such as which side of the phone should face the payment terminal. Accordingly, the IA visual 152 may provide a graphic representation (on the electronic visual display 101) regarding physical components disposed in the interior of the phone, such as an antenna or other communication element disposed in the interior of the phone. The IA visual 152 may also include and/or be associated with audio and/or tactile information. Such audio feedback, tactile feedback, or other sensory feedback may be provided with an IA visual and may be particularly helpful when visibility or viewing of the user device is inhibited in some manner, in accordance with embodiments of the invention. In accordance with embodiments of the invention, an IA visual 152 may include (in addition to graphic(s), audio, tactile and associated text) various processing associated with such sensory outputs.

As shown in FIG. 1 and FIG. 2 and described above, the IA interface 151 includes the IA visual 152. The IA visual 152 includes the IA graphic 151-2 and associated text 152-3, as well as other items or indicia as may be desired. In addition, the IA interface 151 may be provided with an IA on/off slide 155, i.e., a switch. The slide 155 may provide the user with the ability to turn the payment IA portion 150 on or off. With the payment IA portion 150 on, the IA interface 151 is displayed as shown. In particular, the IA visual 152 is displayed so as to provide guidance to the user in positioning her phone over an NFC terminal, for example. On the other hand, if the slide 155 is positioned in the "off" position, then the IA interface 151 disappears from the display 101. With the IA interface 151 "off", it is appreciated that the slide 155 might remain displayed along with suitable indicia, so as to allow a user to turn the IA interface 151 back "on", should the user choose to do so.

As shown in FIGS. 1 and 2, the IA interface 151 further includes a payment readiness indicator 156. As described further below, the payment readiness indicator 156 is provided to advise the user if the phone 100 is ready to make a payment. The payment readiness indicator 153 might be two lights—one red light and one green light, in accordance with one embodiment of the invention. The red light may be shown to reflect that the phone 100 is not ready to make a payment. On the other hand, the green light may be shown to reflect the phone 100 is indeed ready to make a payment. The payment readiness indicator, and the disposition thereof, may be dependent on a variety of parameters. Such parameters may include an observed appropriate proximity of the cell phone 100 vis-à-vis a payment terminal. That is, once the phone 100 is correctly positioned vis-à-vis a payment terminal—the phone processing system 130 will identify such situation, interface with the IA portion 150 to convey such situation, and the IA portion 150 changes the payment readiness light indicator from red to green. It is appreciated that the payment readiness indicator is not necessarily limited to a light, and is certainly not limited to the red-green regime as described above. Rather, the payment readiness indicator may be any suitable visual, audio, tactile, vibration or other sensory output that conveys to the user that the phone 100 is disposed appropriately in order to make a payment.

With further reference to FIG. 1, the user device 100 is connected to a suitable network 20. For example, the network 20 might be a cellular network, mobile network, data network, wireless network, the Internet, Broadband, DSL, Satellite WI-FI or some other suitable network. As is known, the user device 100 may be connected to a wide variety of resources via the network 20. In accordance with one embodiment of the invention, one of these resources is a bank system 200.

The bank system 200 provides various resources including support services to the user device 100. A wide variety of information may be transmitted between the bank system 200 and the user device 100. For example, various financial data may be transmitted back and forth including account data and/or electronic wallet data. In particular, as related more specifically to the invention, the bank system 200 includes an IA support portion 250.

In accordance with one embodiment of the invention, the IA support portion 250 contains and provides various data to the cell phone 100. Such various data is related to operation of the payment IA portion 150 and presentation of the IA visual 152 on the electronic visual display 101 of a user device 100 (e.g. the display 101 of the cell phone 100). In particular, the IA support portion 250 may include a repository 252 of IA visuals for display on respective user devices 100—so as to assist a user in performing a mobile payment in accord with the processing described herein.

In one embodiment of the invention, the repository 252 may include an IA visual data set from which IA visuals may be generated—for display on a particular type of cell phone. The particular IA visual that is generated and displayed (out of a number of IA visuals that may be generated based on the IA visual data set) may be dependent on one or more parameters, as described further below. With some types of phones, the particular IA visual that is displayed may be static—and not change regardless of parameters experienced by the phone. On the other hand, for other types of phones, the particular IA visual that is displayed may be dynamic—and depend on various observed parameters experienced by the particular phone.

With further reference to FIG. 1, the processing system 10 includes various further components. The system includes a point of sale (POS) device 400 and a POS receiver 300. The POS receiver 300 may be associated with an antenna 304 or other suitable communication element. The POS device 400 might be a payment platform of a merchant, for example. The user device 100 communicates with the POS device 400 in order to conduct a transaction in accord with one embodiment of the invention.

In order to effect communication between the user device 100 and the POS device 400, the user device includes a transponder 110 (with antenna 111) which communicates with the receiver 300 via the antenna 304 (which in turn communicates with the POS device 400). For example, the antenna 111 and the antenna 304 may be in the form of an RF antenna, RFID antenna, an NFC antenna, or some other communication element. As used herein, a "transponder" means a device disposed in (or associated with) a user device that (1) responds to an input from a component of a user device by converting such input to a signal that is output through a communication element (such as an antenna) associated with the user device; and/or (2) responds to a signal being input through a communication element (associated with the user device) by outputting data to a component of the user device.

In accordance with one embodiment of the invention, the transponder 110 (of the user device 100) may be or include an electromagnetically coupled component—which might be activated by proximity to an enabled receiving unit, such as the POS receiver 300. Transponder 110 may, for instance, contain an electromagnetic coil antenna for inductive coupling to the POS receiver 300, thereby being energized with small but sufficient electric current to activate embedded electronics within the transponder 110. Those electronics may include memory such as CMOS memory, logic gates, filters for isolating discrete transmission frequencies, and file structures for containing discrete applications. Further, the transponder device 110 may contain various components known in the art for use with NFC, RF, and RFID devices, for example.

In embodiments, transponder 110 may be programmable and able to receive program modules, update programmable instructions, unlock programs or instructions, as well as to have electronic memory erased or updated during transactions, for example. Receiver 300 may include an electromagnetic antenna (as illustrated by the element 304) to couple with transponder 110, generally within the range of a few feet of the device.

In the embodiment illustrated in FIG. 1, the receiver 300 is connected to a point of sale (POS) device 400 for conducting a commercial or other transaction. For instance, the POS device 400 may be or include any of several commercially known electronic cash registers or related transaction processing equipment. In embodiments, the invention may be integrated in a user device as desired, such as a cell phone (as shown in FIG. 1), tablet, IPAD, computer, laptop, PDA (personal digital assistant), wearable, GOOGLE GLASSES, watch, head apparatus, and/or other device, for example.

In operation of the transponder device 110, a user (with her user device) approaches the POS receiver 300 at the point of sale device 400 to initiate and complete a purchase or other transaction, such as at a restaurant or grocery market checkout line, or some other point of sale (POS). For example, the user may approach receiver 300 in a restaurant line and wave her cell phone, or other user device containing transponder 110, in proximity of the receiver 300. When transponder 110 comes within range of receiver 300, transponder 110 may be inductively coupled to the coils of an electromagnetic antenna within receiver 300 inducing electrical energy within transponder 110, to establish a communication link via antenna 111 to antenna 304, and in turn with the receiver 300. Upon activation of transponder 110 and radiation of a transponder ID to the receiver 300, the receiver 300 may respond with an acknowledge signal to the transponder 110. As described further below, the IA interface 151, the payment interface 141 and/or the POS device 400 may indicate at points in the processing the status of the transaction, i.e., for example, that a transaction is ready to be commenced. For example, once the point of sale device 400 generates a total amount due for the transaction, the POS receiver 300 may interrogate transponder 110 to obtain account information complete the transaction.

For instance, if a user has purchased a meal in a restaurant line at the POS device 400, the total purchase price may be validated for completion of the transaction. Conversely, if the amount of the transaction cannot be validated, the point of sale device 400 may indicate "cash required" or another message that transponder validation or authorization has failed. If the transaction amount is validated, receiver 300 receives the transaction amount and transmits the information to the transponder 110. A transaction completion signal may be emitted by receiver 300 and/or by the transponder 110, which in one embodiment may turn off or decouple the transponder 110 vis-à-vis the POS receiver 300.

Figure 10:
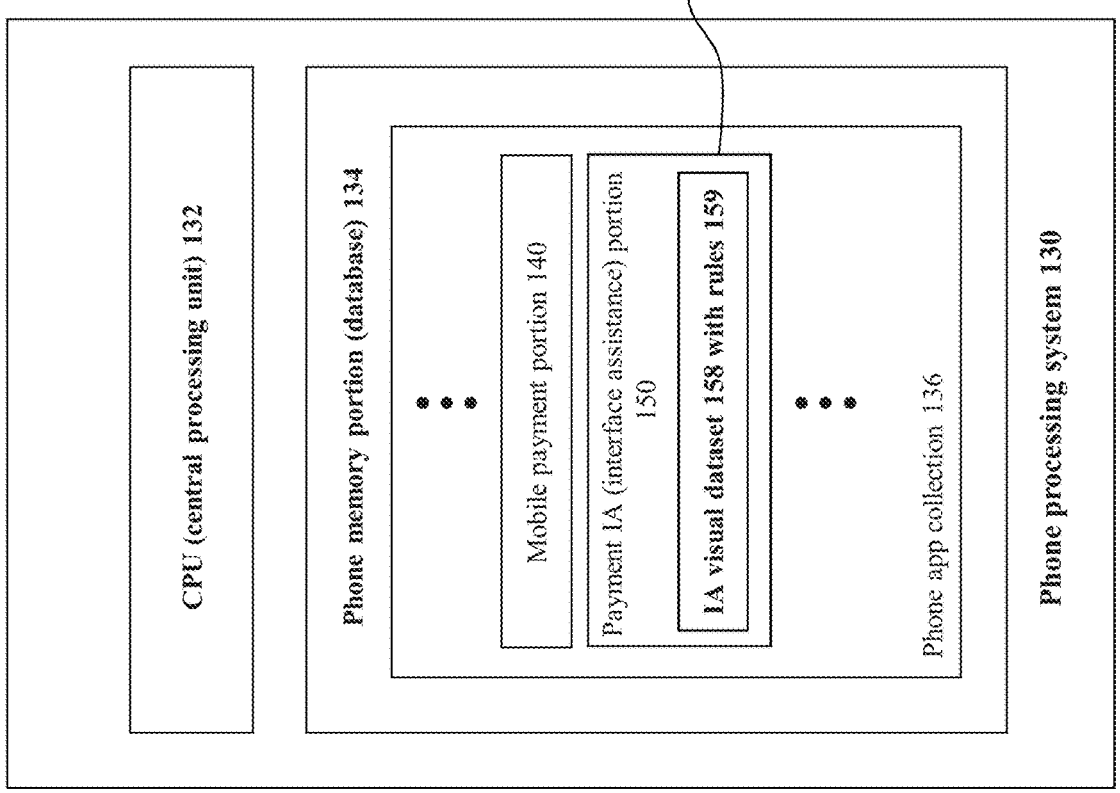
FIG. 10 is a block diagram showing a phone processing system 130, in accordance with one embodiment of the invention.

Hereinafter, further details of the phone processing system 130 are described below in conjunction with description of the various processing performed. In accordance with one embodiment of the invention, FIG. 10 is a block diagram showing a phone processing system 130. The phone processing system includes a CPU (central processing unit) 132 and a phone memory portion 134. The phone memory portion 134 may be in the form of the database in the phone, some computer readable medium, and/or some other form of computer readable storage such that the phone may store data to such phone memory portion 134 and retrieve data from such phone memory portion 134. Further, it is of course appreciated that the phone processing system 130 may well use or be integrated with computer databases in the "cloud" or other resources not within the physicality of the cell phone 100 itself.

As illustrated in FIG. 10, the phone memory portion 134 includes a phone app collection 136. The phone app collection 136 may contain numerous apps for a wide variety of purposes. In particular as related to the invention, the phone app collection 136 includes the mobile payment portion 140 and the payment IA portion 150 in accordance with one embodiment of the invention. In such embodiment the mobile payment portion 140 and the payment IA portion 150 are indeed constituted by respective apps.

The payment IA portion 150 includes an IA visual dataset 158, which may be in the form of a data set of instructions disposed on a computer readable medium. The IA visual rule set 158 includes an IA visual rule set 159, i.e., rules or rules set 159. As described in detail below, the rule set 159 controls what and how variable parameters are used in the decisioning of what IA visual to display. The IA visual dataset 158 may include the IA visual(s) 152 (with graphics, text, tactile and/or audio) and/or computer readable instructions for generating the IA visual(s).

Figure 3:
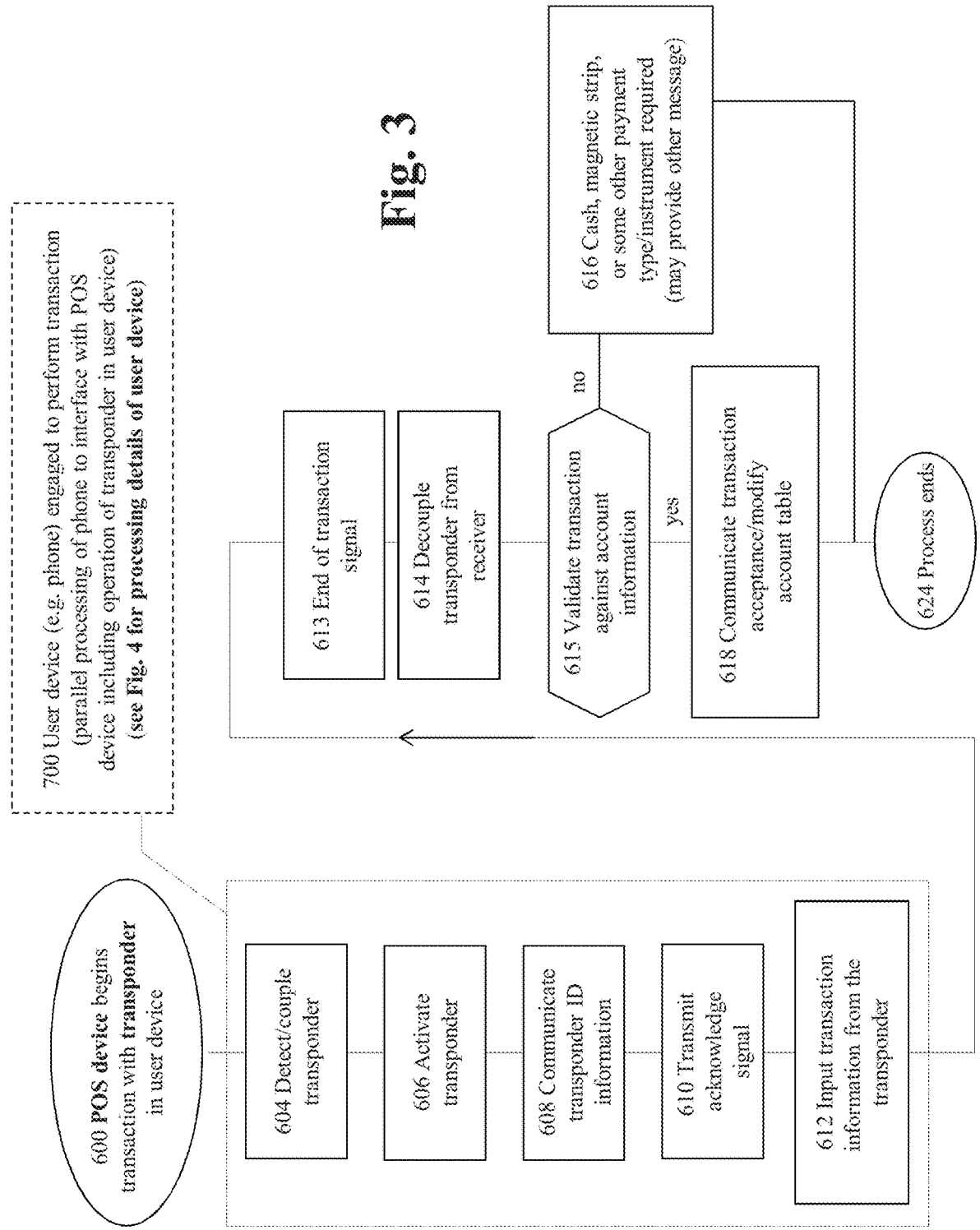
FIG. 3 is a flowchart showing processing associated with a transaction, in accordance with one embodiment of the invention.

In further explanation of the above transaction processing, FIG. 3 is a flowchart showing processing associated with a transaction, in accordance with one embodiment of the invention. The processing of FIG. 3 is described in the context of one type of transponder. However, it is appreciated that the systems and methods of the invention may be utilized with other types of transponders, communication devices and/or other types of communication channels. In particular, the invention may be utilized in conjunction with NFC, RFID, RF, and Bluetooth, for example. Accordingly, the invention is not limited to the particular type of transponder described.

As shown, in FIG. 3, payment processing starts in step 600. The process then passes to step 604. In step 604, the receiver 300 is presented with transponder 110 (communicating via antenna 304 of the POS receiver 300 and antenna 111 of the transponder 110) within range of an electromagnetic coupling, such as an inductive coupling. In step 606, transponder 110 is activated, for instance by inductive energization of its circuitry. In step 608 transponder 110 communicates a transponder ID, which the receiver 300 acknowledges with an acknowledge signal in step 610.

In step 612, transaction information is input from the transponder. After step 612, the process passes to step 613.

In step 613, an end of transaction signal is sent to transponder 110. Then, in step 614, transponder 110 decouples from the receiver 300.

In step 615 of FIG. 3, account information is interrogated to determine whether account parameters permit the pending transaction at the point of sale device 108, i.e., a validation process is performed on the transaction. If the transaction is not validated, then in step 616 a message is generated that some other payment type or instrument is needed to complete the requested transaction. For example "cash required" or "magnetic strip required" or some other message, may be provided to the user at the point of sale device 400. After step 616, processing proceeds to step 624. In step 624, as reflected in FIG. 3, the processing ends.

If the account to be applied to the pending transaction is validated at step 615, then in step 618, the point of sale device 400 (via the POS receiver 300) communicates with transponder 110 to indicate transaction acceptance—and may modify related records, such as an account table.

Accordingly, as set forth above, the processing of a transaction was illustratively described with reference to FIG. 1 and FIG. 2. Hereinafter, various further aspects of the invention including processing of the payment IA portion 150 will be described, as well as various other features.

Ii is appreciated that at various points in the processing of FIG. 3, the cell phone 100 (via the transponder 110 and antenna 111) communicates with the receiver 300 via the antenna 304. In order to enhance this communication, it may well be beneficial for the user to hold his or her phone at a particular "orientation" including but not limited to a particular position, a particular distance, a particular angle, and/or to position her phone at some other particular spatial interrelationship vis-à-vis the antenna 304 of the receiver 300. The IA visual 152, presented on the user device of the user, provides the user with information so as to achieve the best orientation possible so as to perform the desired transaction—and as a result provide the best interface between the user device and the particular POS with which the user wishes to effect the transaction. In particular, the best orientation possible may result in the best transmission strength (e.g. signal strength) and/or a threshold transmission strength between the user device and the POS receiver 300, for example.

Relatedly, it is appreciated that the transmission strength required and/or desired at points in the processing of FIG. 3 may vary. For example, it may be that the strength of transmission needed in step 604 and 606 of FIG. 3 (to detect and activate a transponder) may be less than the strength of transmission needed to input the transaction information from the transponder in step 612. Accordingly, activation of the transponder in step 606 may not need a particular orientation of the phone, whereas the input of transaction information from the transponder in step 612 may indeed require a particular orientation of the phone, i.e., such that if the particular orientation of the phone is not achieved, the transaction and exchange of data may be slower or simply not occur.

In conjunction with the processing shown in FIG. 3, a user device is of course engaged to perform the transaction. In other words, processing in the phone of a user is performed in parallel to the processing of FIG. 3, which provides the interface to perform the requested transaction. This parallel operation of the user device is reflected as step 700 of FIG. 3. Details of the parallel operation of the user device, inclusive of novel processing of the IA portion 150 and generation of the IA visual 152, are described below with reference to FIGS. 4-9.

Figure 4:
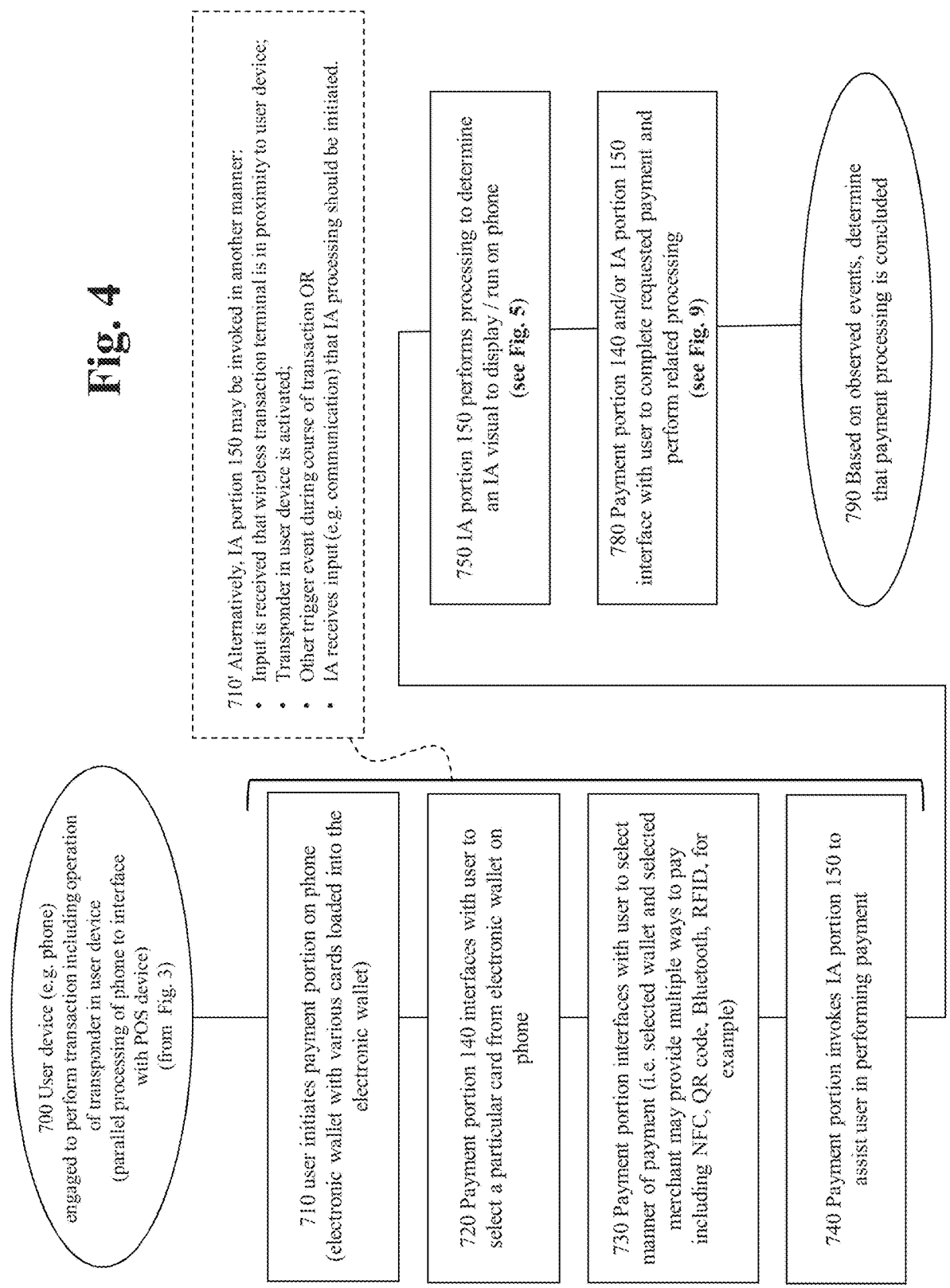
FIG. 4 is a high level flowchart showing operation of a user device, such as a phone, engaged to perform a transaction with a POS device, in accordance with one embodiment of the invention.

Accordingly, FIG. 4 is a high level flowchart showing operation of a user device, such as a phone, engaged to perform a transaction with a POS device, in accordance with one embodiment of the invention. Illustratively, the transaction may be an NFC enabled transaction.

As shown, the processing of FIG. 4 starts in step 700 and passes to step 710. In step 710, the user (i.e. the customer) initiates a payment portion on the phone of the user. As described above, the payment portion might well be in the form of an "app" associated with a particular bank or other financial institution. For example, the payment portion might be an electronic wallet with various cards loaded into the electronic wallet. After step 710 of FIG. 4, the processing passes to step 720. In step 720, the payment portion 140 interfaces with the user to select a particular card from the electronic wallet on the phone of the user. Once the particular card is selected from the wallet, the processing passes to step 730.

In step 730, the payment portion interfaces with the user to select a particular manner of payment. That is, it is appreciated that a particular payment app, payment portion, electronic wallet, card, and/or merchant, for example, may provide one or more ways to conduct a requested transaction. For example, the user might be provided options including NFC, QR code, Bluetooth, RF and/or RFID. Upon the user being presented with the possible options, the user will choose a particular option. Thereafter, the processing of FIG. 4 passes to step 740. In step 740, the payment portion invokes the IA portion 150 to assist the user in performing the payment. Accordingly, in this manner, the IA portion 150 is invoked upon some predetermined aspect of the transaction being determined and/or selected by the user. In general, it is appreciated that it may well be desirable to invoke the IA portion at a point in the transaction at which the user is (or is about to) dispose her phone over a payment terminal to perform the transaction. It is appreciated, and as reflected in box 710' of FIG. 4, that the IA portion 150 might be invoked upon the occurrence of any suitable event as desired. Accordingly, the IA portion 150 might be invoked upon the user device receiving input that a wireless transaction terminal is in proximity to the user device. Alternatively, the IA portion 150 might be invoked upon a transponder in the user device being activated—or some other trigger event during course of transaction. On the other hand, the IA portion 150 might be activated upon the user device receiving some communication that reflects the transaction is to be performed—and accordingly activates the IA portion 150. Such functionality is further described below.

As shown in FIG. 4, upon the IA portion being activated to assist the user in performing the payment, the processing passes to step 750.

In step 750, the IA portion 150 performs processing to determine an "IA visual" to display on the user's phone. Further details of this processing are described in FIG. 5. As otherwise described herein, an IA visual 152 may include a graphic or graphics, associated text, associated audio, associated tactile output and associated processing. In particular, it is appreciated that processing may progressively control the display of multiple graphics as the phone is positioned at discrete orientations vis-à-vis a payment terminal.

After step 750 of FIG. 4, processing passes to step 780.

In step 780, the payment portion 140 and/or the IA portion 150 interface with the user to complete the requested transaction and perform related processing. Further details of such processing are described below with reference to FIG. 9. For example, such processing may include the progressive display of graphics and the adjustment of settings related to the payment portion 140 and/or the IA portion 150.

After step 780, the processing of FIG. 4 passes to step 790. In step 790, based on observed events, the processing determines that payment processing is completed. Accordingly, processing is terminated.

In conjunction with the process described above, FIG. 5 is a flowchart showing in further detail the IA portion 150 performs processing to "determine an IA visual to display on the user device" step 750 of FIG. 4, in accordance with one embodiment of the invention. As shown, the processing starts in step 750 and passes to step 751.

Figure 5:
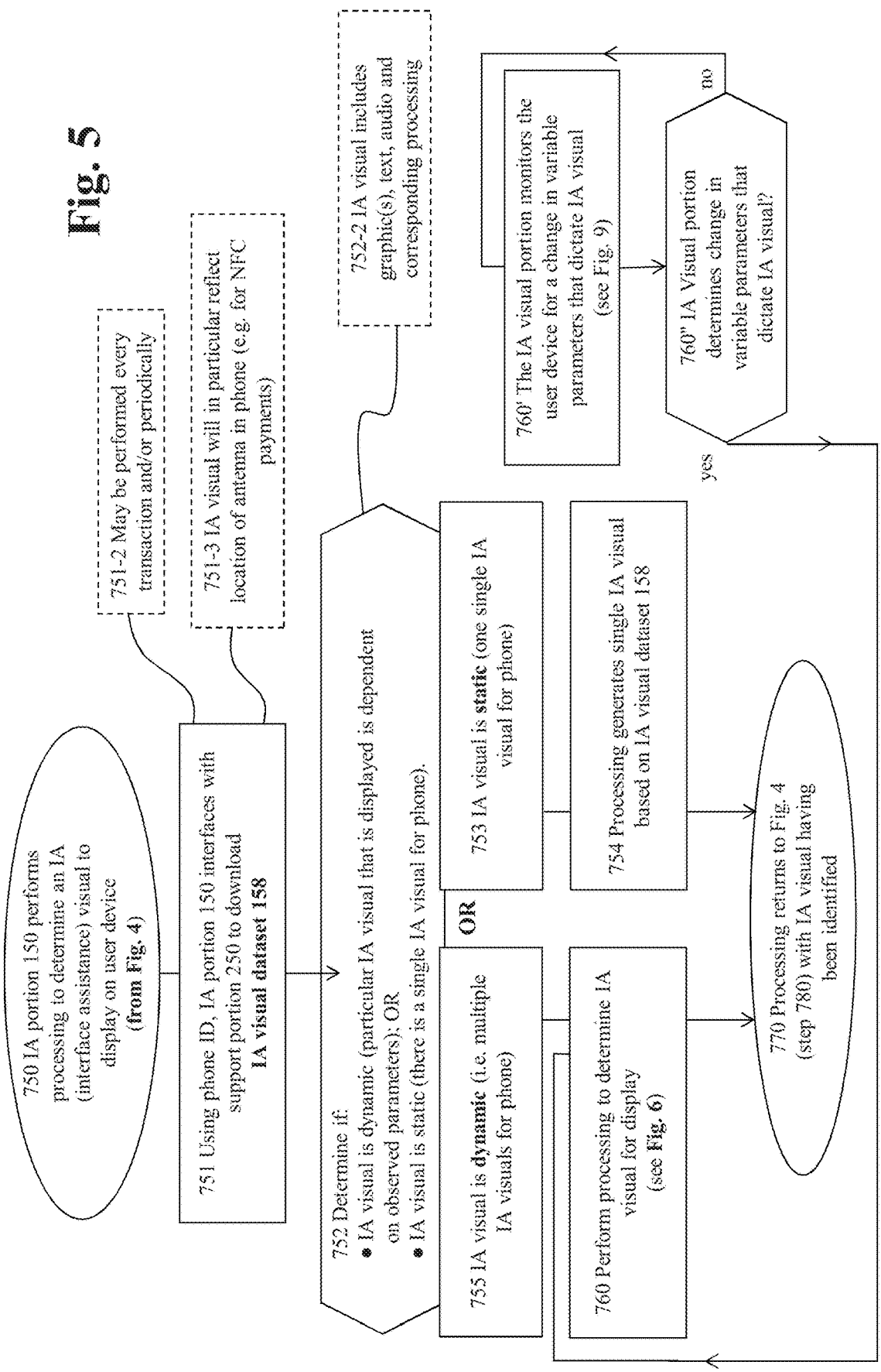
FIG. 5 is a flowchart showing in further detail the IA portion 150 performs processing to "determine an IA visual to display on the user device" step 750 of FIG. 4, in accordance with one embodiment of the invention.

Step 751 of FIG. 5 reflects that the IA portion 150 (disposed in the user device 100) interfaces with the IA support portion 250 (in the bank system 200). Such interface might be performed over any suitable network, such as a cellular network or other network described herein, for example. In such interface between the IA portion 150 and the IA support portion 250, the IA portion 150 secures the appropriate IA visual 152 for display on the user device so as to assist in attaining proper communication between the user device and a payment terminal. In the invention, for a particular phone, the IA visual for the phone might be a single graphic with associated text. Such single graphic with associated text may not be dependent on any variables other than the particular type of phone. In such situation, the IA visual might be characterized as "static." On the other hand, for another type of phone, there may be an IA visual that includes a plurality of graphics, associated text, and various associated processing. The determination of which graphics and text are displayed (i.e., what IA visual 152 is displayed) under what conditions are controlled by associated processing.

Accordingly, in step 751, using the phone ID, for example, the IA portion 150 interfaces with the IA support portion 250 to download an IA visual dataset 158, which may include a rule set 159, that dictates which IA visual to display under which circumstances.

As reflected in FIG. 5, it is appreciated that the particular time and/or periodicity at which the IA portion 150 (in the user device) interfaces with the support portion 250 (to download the IA visuals) may vary widely. For example, such interface might indeed be performed for every transaction, periodically in some manner such as every month, upon an update being pushed to the support portion 250, or upon the occurrence of some other event, as may be desired.

After step 751 of FIG. 5, the processing passes to step 752. In step 752, the IA portion 150 determines if the IA visual is dynamic (and the particular IA visual displayed is dependent on observed parameters), or alternatively, whether the IA visual is static (in such case there is a single IA visual for the phone).

Step 755 of FIG. 5 reflects a determination (in one situation) that the IA visual was determined to be dynamic. In such situation, the processing passes to step 760 in which processing is performed to determine the particular IA visual (out of the various IA visuals possible as generated by the IA visual dataset 158) that is to be displayed. Such processing is described in further detail with reference to FIG. 6 below. After step 760, the processing passes to step 770 of FIG. 5.

On the other hand, step 753 reflects a determination (in one situation) that the IA visual was determined to be static. In such situation, the processing passes to step 754. In step 754, the processing tags the single IA visual as the IA visual for display. Thereafter, the processing passes to step 770 of FIG. 5.

In step 770 of FIG. 5, the processing returns to FIG. 4, step 780, with an IA visual having been identified.

FIG. 5 further includes step 760'. Step 760' reflects processing that is performed by the IA portion in the situation of dynamic IA visuals. That is, as described above, in the case of a dynamic IA visual—a particular IA visual is generated from an IA visual dataset. The particular IA visual that is selected is dependent upon variables associated with the user device. Relatedly, during the course of a transaction, the variables which dictate the particular IA visual that is selected may indeed vary. For example, one such variable might be the orientation of the phone—and the orientation of the phone may well vary during the course of the transaction. Accordingly, the processing of step 760' illustrates that the IA visual portion 150 monitors the user device for a change in the variable parameters that dictate the particular IA visual displayed. That is, in a periodic manner and/or based on predetermined inputs, the IA visual portion 150 performs decisioning to determine if there is a change in any of the variable parameters that dictate the particular IA visual selected. Such processing is reflected in step 760" of FIG. 5. If "no" in step 760" of FIG. 5, then the processing returns to step 760' and further waits for the next determination of whether any variables that effect the IA visual 152 have changed. On the other hand, if "yes" in step 760" (that is, the IA visual portion determines that there is indeed a change in at least one of the variable parameters that dictate the particular IA visual generated (i.e., selected), then the processing returns to step 760 of FIG. 5. Processing then continues as described above. That is, in step 760, processing is performed to determine a particular IA visual 152 for display.

Figure 6:
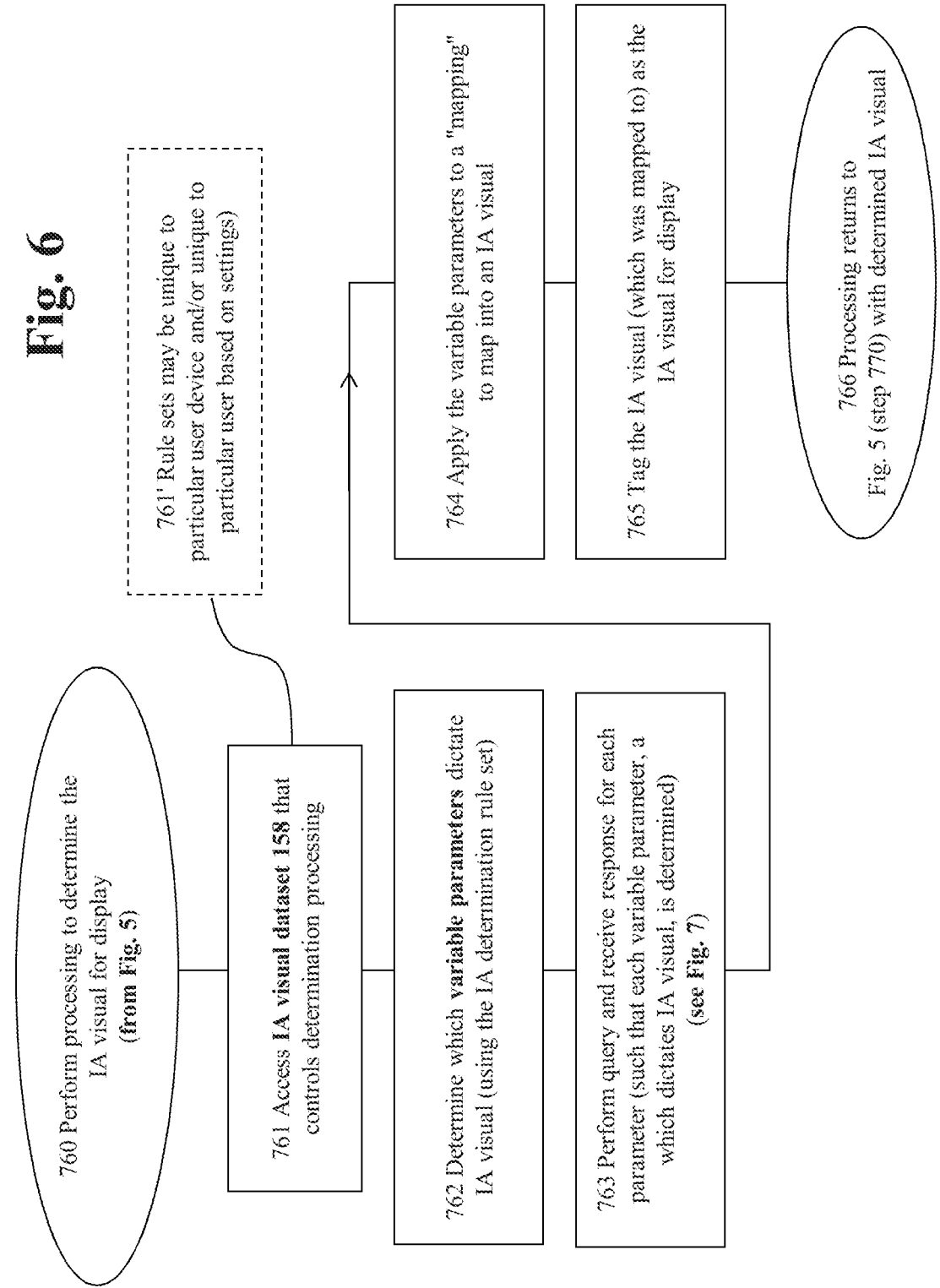
FIG. 6 is a flowchart showing in further detail the "perform processing to determine an IA visual for display" step 760 of FIG. 5, in accordance with one embodiment of the invention.

FIG. 6 is a flowchart showing in further detail the "perform processing to determine an IA visual for display" step 760 of FIG. 5, in accordance with one embodiment of the invention. As shown, the processing of FIG. 6 starts in step 760 and passes to step 761.

In step 761, the IA portion 150 accesses the IA visual dataset 158. As described above, the IA visual dataset 158 with rules set 159 controls the processing that is performed to determine the particular IA visual that is selected for display. The IA visual dataset 158 may be uploaded to the cell phone 100 from the IA support portion 250.

As shown in box 761', the IA visual dataset 158 with rules set 159 may be unique to a particular user device or unique to a particular user, for example. Further, a user may be provided the ability to vary the IA visual dataset 158 with rules 159 on her phone by adjustment of settings in accordance with one embodiment of the invention.

After step 761, the processing passes to step 762.

In step 762, the IA portion 150 determines (using the rule set 159) which variable parameters dictate the IA visual that is selected for display on the user's phone. The particular IA visual that is selected may depend on any number of variable parameters. In a simple illustration, the particular IA visual that is selected may simply depend on the orientation of the phone. If the phone is physically oriented to generate a portrait display, then a first IA visual might be displayed. On the other hand, if the phone is physically oriented to generate a landscape display, then a different IA visual might be displayed.

On the other hand, the particular IA visual that is generated may depend on a number of variable parameters. Such variable parameters might include the geo-location of the phone; the OS (operating system); the communication channel used to perform the transaction; the type of transaction; attributes of the payment terminal including attributes of the POS device to perform the transaction; the value of the transaction; other attributes of the phone including hardware, software modifications and/or add-ons; status of the card, token, wallet and/or payment platform used to perform the transaction; and/or other parameters associated with the user, the user device, the payment and/or the particular POS, for example.

Referring further to FIG. 6, after step 762, the processing passes to step 763. In step 763, the IA portion 150 performs a query to determine the value of each variable parameter that dictates (either alone or collectively with other parameters) the particular IA visual selected, i.e., the IA visual that will be displayed. Further details of step 763 (of FIG. 6) are described below with reference to FIG. 7.

Figure 8:
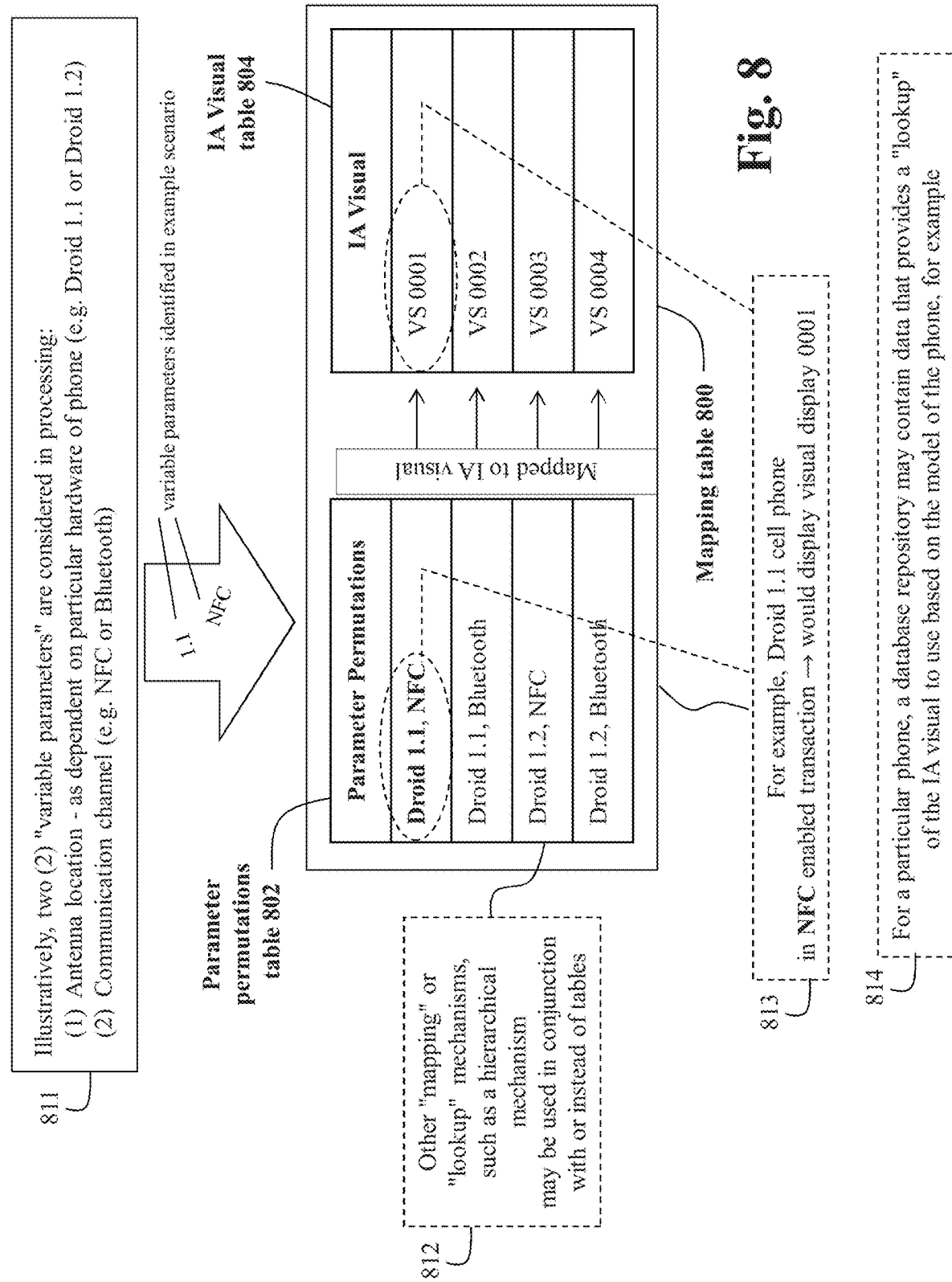
FIG. 8 is a diagram showing a "mapping," in accordance with one embodiment of the invention.

After step 763 of FIG. 6, the processing passes to step 764. In step 764, the processing applies the variable parameters, which were determined in step 763, to what may be characterized as a "mapping." Such mapping maps, i.e. associates, the variable parameters to an IA visual 152 for display (and in this manner generates and/or determines a particular IA visual 152 for display). Further details of such mapping are described below, and in particular with reference to FIG. 8. Specifically, FIG. 8 is a diagram showing a "mapping" to determine an IA visual 152, in accordance with one embodiment of the invention.

After step 764 of FIG. 6, the processing passes to step 765. In step 765, the IA visual, which was mapped to in step 764, is tagged as the IA visual for display. That is, the system associates a tag with the particular IA visual so that the system knows to use that IA visual for display on the user device. Such might be characterized as assimilating or rendering the IA visual 152—and preserving or saving the assimilated or rendered IA visual 152 for later display After step 765, the processing passes to step 766. In step 766, the processing returns to FIG. 5, and specifically step 770 of FIG. 5, with the IA visual having been determined. As otherwise noted herein, it is appreciated that the processing performed in FIG. 6 may be performed by the mobile payment portion 140, which may well be in the form of an "app" disposed on the phone or other user device.

Figure 7:
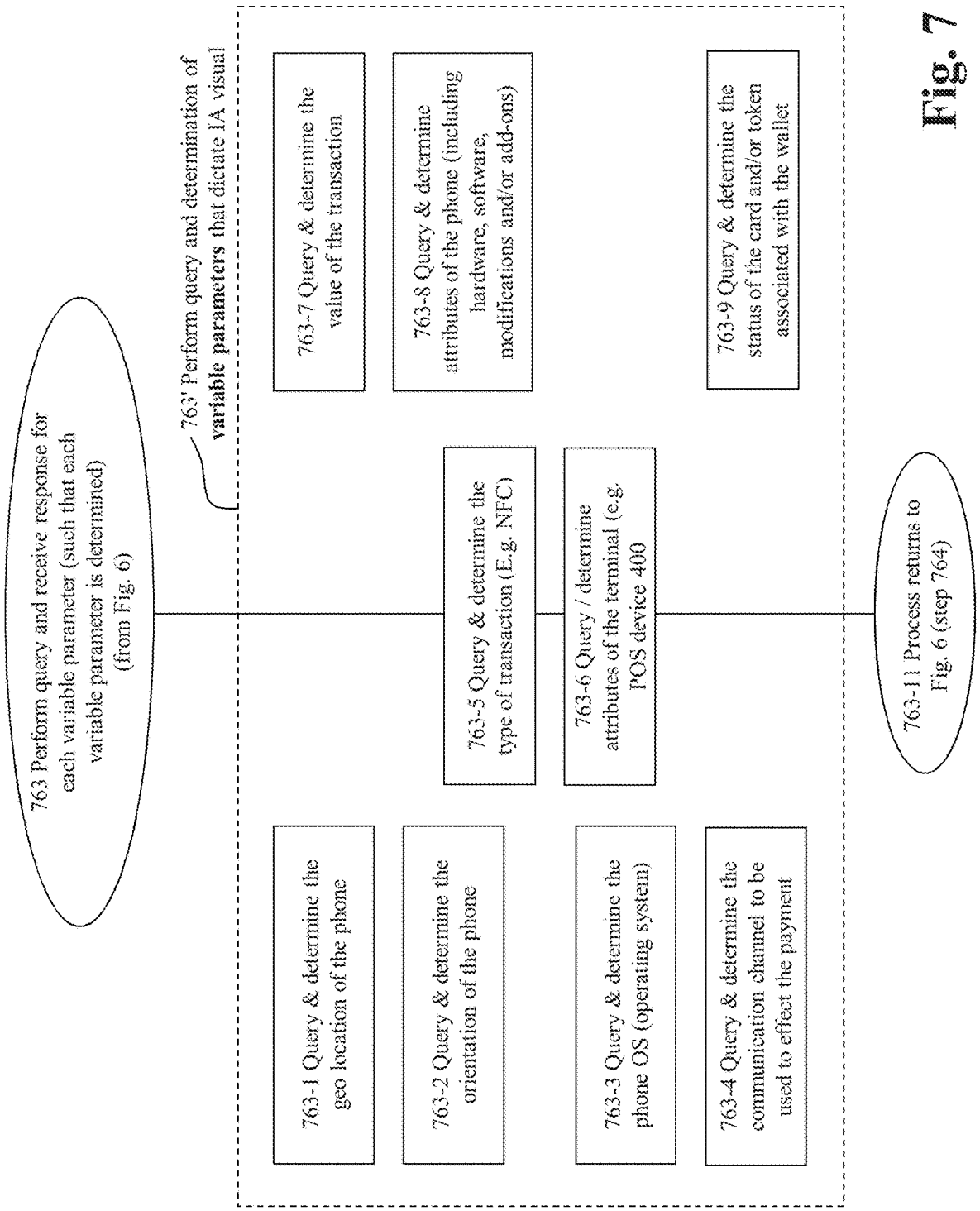
FIG. 7 is a flowchart showing processing to perform a query and receive a response for variable parameter(s) that dictate the particular IA visual that is displayed on the user device, in accordance with one embodiment of the invention.

As referenced above, FIG. 7 is a flowchart showing processing to perform a query and receive a response for variable parameter(s) that dictate the particular IA visual that is displayed on the user device. Such processing may be controlled by a suitable rule set, such as the rule set 159 described above. As shown, the processing starts in step 763 of FIG. 7 and passes to step 763'.

In accordance with one embodiment of the invention, step 763' reflects the various queries and determinations that may be performed in determination of an IA visual for display on the user device. The processing of FIG. 7 may be performed by the IA portion 150. It is appreciated that the various queries and determinations of FIG. 7 may be performed in a wide variety of manners. Such query and determination may be performed by accessing a database or data set, for example, to retrieve the particular variable parameter. On the other hand, such query determination may be performed by accessing a suitable input device, such as a sensor on the phone, for example.

Accordingly, in step 763-1, the IA portion 150 queries and determines the location of the phone. Such may be performed by the IA portion 150 interfacing with a GPS (global positioning system) component of the phone. In step 763-2, the IA portion 150 queries and determines the orientation of the phone. Such data may be provided by an orientation sensor in the phone, and via the IA portion 150 interfacing with the orientation sensor. In step 763-3, the IA portion 150 queries and determines the OS of the phone. Such processing may be performed by the IA portion 150 interfacing with a data set that reflects properties of the phone. Further, in step 763-4 the IA portion 150 queries to determine the communication channel to be used to affect the payment. In step 763-5, the IA portion 150 queries and determines the type of transaction being used in the transaction. For example, the transaction might be an NFC transaction. In step 763-6, the IA portion 150 queries and determines the attributes of the payment terminal (being interfaced) to perform the transaction, i.e., the attributes of the particular POS device, POS receiver and/or antenna, for example.

In step 763-7, the IA portion 150 queries and determines the value of the transaction. Illustratively, for a higher value transaction, the processing may require the interface between the user device and the POS device to be stronger and/or satisfy more stringent requirements vis-à-vis a lower value transaction. As a result, if the IA portion 150 identifies that it is a high-value transaction being processed, the IA portion 150 might generate a different IA graphic(s) vis-à-vis a lower value transaction.

In step 763-8, the IA portion 150 queries and determines attributes of the phone. As related to step 763-6, is appreciated that various attributes of the phone might be used in generation of a particular IA visual in addition to the particular OS of the phone. For example, such additional attributes may include hardware included in, on, or associated with the phone. Such hardware might be included in manufacture of the phone and/or added on by the user in some manner. Additional attributes reflected in step 763-8 of FIG. 7 include software modifications and/or any other add-ons.

In step 763-9, the IA portion 150 determines the status of the particular card, token and/or wallet associated with the transaction. In general, it is appreciated the particular attributes of the card, other payment mechanism and/or payment platform used by the user to complete the transaction, might be a variable parameter that would affect what IA visual is displayed.

Accordingly, various attributes have been discussed, with reference to FIG. 7, which may affect the particular IA visual displayed on the user device. However, such description is not limiting in that it is appreciated various other attributes might also affect which IA visual is displayed. Further, it is of course appreciated that it may well be the case that not all the processing of FIG. 7 may be performed for a particular user device. For example, it might be the case that only geolocation and orientation of the phone is used to determine which IA visual is displayed. In such scenario, only the processing of step 763-1 and step 763-2 would be performed.

As shown in FIG. 7, after the various processing of step 763', the processing passes to step 763-11. In such step, processing returns to FIG. 6 and specifically returns to step 764 of FIG. 6. Processing then continues as described above—with the IA portion 150 having retrieved the needed variable parameters and determined which IA visual is to be displayed on the user device.

As described above, FIG. 8 is a diagram showing a "mapping" in accordance with one embodiment of the invention. In step 764 of FIG. 6, processing is performed to map "variable parameters" to the particular IA visual 152 that is to be displayed. Accordingly, FIG. 8 describes, in further detail, particulars of the manner in which the mapping of step 764 may be performed.

FIG. 8 includes a mapping table 800. The mapping table 800 includes a parameter permutations table 802 and an IA visual table 804. As shown, each item in the parameter permutations table 802 is mapped to an item in the IA visual table 804. It is appreciated the one-to-one correspondence shown in FIG. 8 may not necessarily be the case. Rather, multiple parameter permutations (in the parameter permutations table 802) might be mapped to a single IA visual. Other variations are of course possible, as may be desired.

In the example of FIG. 8, there are illustratively two variable parameters as shown in box 811. One variable parameter is the antenna location in the particular phone of the user. In accord with one embodiment of the invention, the antenna location is an integral part of the hardware of a particular phone. Accordingly, in such a situation, the location of the antenna in a particular phone is dictated by the hardware of the particular phone, i.e., the antenna is part of the hardware of the phone. However, with some phones, it may be that location of an antenna may not be integrally tied with the hardware of the phone. For example, it may be the case that components of the phone are variously energized so as to in effect vary the location of the phone's antenna.

A particular phone may be represented by any of a wide variety of indicia, such as a manufacturer, model name and/or a model number, for example. For example and illustratively, the rule set 159 (in the IA visual data set 158 described herein) might perform decisioning to determine whether the particular phone is a Droid 1.1 or a Droid 1.2. In the example of FIG. 8, a second variable parameter is the communication channel that is to be used for the particular transaction. In the example of FIG. 8, the IA portion 150 performs decisioning of whether NFC or Bluetooth will be utilized in the transaction. It is further appreciated that another variable parameter may be constituted by the operating system (OS) of the phone. In such situation, the particular OS used by the phone would be used to determine which IA visual to display (to the user) in conjunction with performing a transaction.

In the example of FIG. 8, the IA portion 150 determines (1) that the user phone is a Droid 1.1 and (2) that the transaction is an NFC transaction. Accordingly, these two determined variable parameters are input into the parameter permutations table 802. The parameter permutations table 802 includes a record of sorts for each permutation of the variable parameters. The first record in FIG. 8 is "Droid 1.1, NFC". Accordingly, in the example of FIG. 8, the IA portion 150 will map to the first record (in the parameter permutations table 802) since it is the particular record which corresponds to the observed variable parameters.

In turn, the processing will map from the first record in the parameter permutations table 802 to the first record in the IA visual table 804. As result, as reflected in box 813 of FIG. 8, the particular IA visual that will be used (in this example) is the IA visual "VS 0001".

In further explanation, as described above, the particular IA visual that will be invoked and displayed (in this example) is the IA visual "VS 0001". Such IA visual is displayed on the user's phone and provides information to the user regarding how the user should hold her phone to perform the requested transaction. Accordingly, the physical location of an antenna (in a particular model phone for example) may well affect the particular IA visual that is displayed to the user. As otherwise described herein, FIG. 11 shows an example of such an IA visual. Accordingly, such IA visual reflects (and is based upon) the physical hardware of the particular phone, in accordance with one embodiment of the invention. In other words, the target area 1121 shown in FIG. 11 indeed corresponds to the physical location of the antenna within the phone 1100. It may well be the case that the physical location of the antenna is the only parameter that dictates the particular IA visual is displayed to the user, i.e., in conjunction with the physical location of the screen (i.e., display) of the user device and the position that the IA visual is displayed on such screen of the user device. However, as reflected by the example of FIG. 8, the particular IA visual that is displayed may be dependent on additional factors, i.e., in the case of FIG. 8 such an additional factor is the particular communication channel utilized for the transaction.

In accord with another aspect of the invention, is appreciated that the particular IA visual that is displayed to a user may well be, in one way or another, dependent on the physical location of the antenna, other attributes of the antenna, and/or other hardware within the phone. However, the particular IA visual that is displayed to a user (on the user's phone) may or may not actually show location of the antenna.

For example, it may be the case that a particular type of antenna casts a electromagnetic field which is a distance away from the physical antenna itself. In such situation, an IA visual displayed on the user's phone would indeed not coincide or reveal the physical location of the antenna within the phone. However, such IA visual would reveal how the user should hold her phone to best leverage the cast electromagnetic field.

Accordingly, it may well not be the objective of the IA visual to reveal to the user the particular physical location of an antenna within the user's phone. However, in accordance with embodiments of the invention, it is an objective of the invention to show the user, either through graphics and/or text for example, how to best orient her phone to perform the requested transaction.

The example of FIG. 8 is a situation where the particular IA visual displayed is dependent on both the particular model of phone and the particular communication channel used in the transaction. For example, it might be the case that the particular model of phone has two respective antennas for NFC and Bluetooth communications. Hand-in-hand, one IA visual is displayed for a Droid 1.1 phone for an NFC transaction vis-à-vis a second IA visual is displayed for a Droid 1.1 phone for a Bluetooth transaction.

It is appreciated that as a manufacturer releases a new phone, such new phone possesses an antenna physically located at a particular position within the phone. Accordingly, a new IA visual is created, based on the position of the antenna in the new phone, that shows the user how to best hold her phone to perform a particular transaction. As described above, such new IA visual may or may not actually show the physical location of the antenna within the new phone. However, as described above, such new IA visual, based on the physical location of the antenna in the phone, shows the user how to best position her phone to perform the transaction.

The particular manner in which a new IA visual is created (to be used with a newly manufactured phone for example) may vary. For example, the new IA visual might be created by a person with knowledge of the antenna location and functionality of the particular new phone. On the other hand, for example, the new IA visual might be created in some automated manner based on data representing the attributes of the phone, i.e., data representing location of the antenna. In either case, the created IA visual is mapped to the particular attributes of the phone upon which display of the particular IA visual is dependent. The mapping might include a "lookup" which associates particular attributes of the phone with a particular IA visual. Alternatively, some other manner of associating attributes of the phone with a particular IA visual might be utilized, i.e. other than a "mapping" or a "look-up."

The particular manner in which a new IA is generated for a new device may involve various methodologies. For example, when a new phone (or other device) comes out from the manufacturer or is to be newly enabled with an IA visual, it may be the situation that the "specs" for the particular device are available online or through some other resource. In such situation, the location of the antenna (of the device) may be determined from the specs—and in turn an IA visual may be developed based on the location of the antenna. In the situation where the specs of the device, or other information indicating the location of the antenna, is not available—other approaches may be utilized. For example, a "tear down" of the device may reveal the antenna location. Once the location of the antenna in a new device is determined, then that information may be uploaded to a suitable database. Such suitable database may be the repository 252 as shown in FIG. 1.

As otherwise described herein, it is appreciated that the particular data stored in the repository 252 (or other suitable database) may vary in nature. For example, the data may contain the location of the antenna in a particular model phone. Such location might be described in terms of X,Y coordinates or some other coordinate system or spatial system, for example. In such situation, the payment IA portion 150 may input the coordinates of the antenna and generate the IA visual based on such coordinates. However, in other embodiments, the repository 252 may indeed include the IA visual that is to be used with a particular phone. In such situation, the payment IA portion 150 would provide the phone model information, e.g., to the repository 252—and in response be provided with the particular IA visual that corresponds to that phone. In addition to the particular model phone, other attributes of the phone and/or other situational variables may be a factor in the particular IA visual (that is to be used) for a particular phone.

As otherwise described herein, it is appreciated that the particular IA visual displayed may well vary based on the particular communication channel used to perform the transaction. With NFC transactions, it may be the situation that the "sweet spot" in positioning the phone is very limited. For example, the position of the phone may have to be within 2 or 3 centimeters of the NFC terminal. Other types of communications will not be as demanding in positioning of the phone. For example, in the case of performing a transaction via Bluetooth, there may be no particular requirements in position of the phone. Accordingly, the IA visual displayed for a Bluetooth transaction may well include text that reflects the position of the phone is not important.

It is appreciated that the systems and methods of the invention are not limited to the particular "table" approach of FIG. 8. For example, as reflected in box 812 of FIG. 8, other mapping mechanisms such as a hierarchical mechanism might be used in conjunction with or instead of a table. In general, it is appreciated that processing of the IA portion 150 and rule set 158 may well take into account various possible scenarios associated with the variable parameters and the manner in which the variable printers are mapped into a particular IA visual. For example, it may be the case that the rule set 158 is programmed to consider predetermined variable parameters, but at the time of the transaction, not all those variable parameters are obtainable. Accordingly, the rule set 158 may contain rules regarding which variable parameters are necessary in order to display an appropriate IA visual and which parameters are not necessary. In other words, such parameters that are not necessary might be utilized, if available, to enhance the user experience—but are not necessarily needed to generate an appropriate IA visual. Relatedly, it may well be the case that some variable parameters may be more important or critical than other variable parameters. In such scenario, it may be the case that some variable parameters effectively "trump" other variable parameters. Accordingly, even though some variable parameters are indeed available to the IA portion 150—such variable parameters might not be utilized since they are trumped by other, more controlling, variable parameters. In general, it is appreciated that the rules 152 may reflect a hierarchy of which variable parameters control, which variable printers do not control, and related items.

FIG. 9 is a flow chart showing in further detail the "payment portion 140 and IA portion 150 interface with user to complete requested payment" step 780 of FIG. 4 in accordance with one embodiment of the invention. As shown, the processing starts in step 780 and passes to processing as reflected in step 781.

In general, step 781 reflects various processing that may be performed over the duration of a transaction. In particular, it is appreciated that the particular IA visual that is displayed to the user, at different points in the transaction, may change. For example, as an antenna of a phone attains increased proximity vis-à-vis an NFC terminal, the IA visual may change. As described above, the IA visual may include a payment readiness indicator 156. In an embodiment of the invention, the payment readiness indicator 156 may change from red to green reflecting that the phone is ready to perform a transaction. Accordingly, such processing is reflected in step 781.

The processing of step 781 includes step 782 and/or step 783.

The step 782 of FIG. 9 reflects processing to provide interactive display components of the IA visual on the phone. Such processing may include step 782-1 and/or step 782-2 of FIG. 9. In the processing of step 782-1, progressive graphics are generated as the user advances through the transaction. Accordingly, the processing as reflected in step 72-1 might be characterized as routinely occurring during the course of the transaction.

On the other hand, the changes as reflected in step 782-2 relate to whether the status of the phone changes and are not necessarily tied or associated with the normal progression of the transaction. More specifically, in step 782-2, the IA portion 150 provides what is here characterized as "dynamic graphics" in such processing, the IA visual changes as the status of the phone changes. One example is that the orientation of the phone changes—and as a result, the particular IA visual that is displayed would also change, in accordance with one embodiment of the invention.

The processing of step 782-1 and step 782-2 relates to step 760' of FIG. 5, as described above. That is, in such step 760' the IA visual portion monitors the user device for a change in variable parameters that dictate the IA visual display. Upon a change in the variable parameters being detected, the IA visual portion determines if such change dictates a change in the IA visual.

Processing step 781 also includes step 783. In step 783, the user adjusts setting or settings associated with the payment portion 140 and/or the IA portion 150. The particular settings adjustable may vary widely, as should be appreciated. For example, any of the settings described herein may be adjusted in such processing is desired. Further, it is appreciated that the adjustment of such settings is not necessarily limited to being performed in conjunction with a transaction. Rather, such settings may be provided to be adjustable at any time through a suitable user interface.

After the processing of step 781 a FIG. 9, processing returns to FIG. 4 in step 790. Thereafter, the processing continues as described above.

FIG. 11 is a diagram showing a user device 1100 with an IA visual 1120 in accordance with one embodiment of the invention. As illustrated, the user device 1100 is a smartphone. The smartphone 1100 includes an electronic visual display 1101. As shown, a payment icon 1110 is displayed on the display 1101. In conjunction with display of the icon 1110, the display 1101 also includes an IA visual 1120 in accord with the invention.

The IA visual 1120 may contain various components as otherwise described herein. As shown, the IA visual 1120 contains a target area 1121, text 1123, and IA on/off slide 1124. The target area 1121 corresponds to the physical location of an antenna in the cell phone 1100. Accordingly, to perform a requested transaction, the user simply follows the instructions "TAP here" and taps the cell phone 1100 proximate to an NFC terminal (with which the user wishes to perform the transaction).

The IA visual 1120 may be generated by a suitable processing portion as described herein, as desired. Further, the IA visual 1120 may be invoked via a suitable trigger, such as the launch of the payment app that generates the payment/wallet icon 1110.

FIG. 12 is a further diagram showing a user device 1200 with an IA visual 1220 in accordance with one embodiment of the invention. As illustrated, the user device 1200 is a smartphone. The user device 1200 includes an IA visual 1220, which is displayed on the display 1201 of the smartphone 1200. The display 1201 also shows a payment icon 1210. The payment icon 1210 may be associated with a particular bank card and/or electronic wallet, for example. The payment icon 1210 may be associated with a variety of text to convey information to the user. For example, as illustrated in FIG. 12, the text may convey "This card will be used for next payment" and "Tap anywhere to change card".

The IA visual 1220 may include a variety of components. A target area 1222 is shown in FIG. 12. The target area 1222 indicates the location of the NFC antenna for that particular device 1200. It is appreciated that the IA visual 1220 may be associated with various functionality. For example, functionality might include that rotating the user device in some predetermined manner, while the wallet or payment app is opened, displays the IA visual 1220.

As further reflected in box 1201 of FIG. 12, it is appreciated that the IA visual 1220 may also include the status of the payment app, account and/or wallet, for example. For example, a standard icon may be used for notification purposes. Such standard icon might be blue, for example. The standard icon may be used to convey information such as payment messages, store offers, balance information, as well as other information. A different shape and/or color icon might be utilized to reflect a wallet state (such as an invalid token) or some other error state. For example, such icon might be red in color. Additionally, a different shape and/or color icon may be used to reflect that the wallet or other payment mechanism is open and active with a valid token, i.e., that a "ready to pay" status has been attained. Such would indicate to the user that payment can be made. For example, the color of such icon might be green. In accordance with embodiments of the invention, the "token" may be constituted by a unique identifier used in place of sensitive bank account information. This token or identifier may be matched up with other security information (e.g., cryptogram, keys). The token and accompanying security information may need to be periodically refreshed, in accordance with one embodiment of the invention.

In accordance with embodiments of the invention and as otherwise described herein, it is appreciated that various other features and functionality may be provided related to status of the user device, and in particular status of the user device related to transaction processing.

One further feature may be provided that relates to connectivity of the user device and sequential transactions. For example, the rules 159 (of the IA visual data set 158) may be implemented that control the number of transactions that may be performed while the user device is out of connection with an authenticating entity, the cloud, Internet and/or other entity involved in the transaction processing. For example, business rules may be provided that a user is only enabled to perform three (3) transactions without reconnecting to an authenticating entity or other transaction related entity. Such situation might occur when a user is in a subway or Metro train, for example. Accordingly, if a user has performed 3 transactions and not connected to an authenticating entity or other transaction related entity, then further transactions will be precluded. Such scenario might be reflected on the user's phone by a red icon, which shows that further transactions are not allowed or some other suitable graphic. It is appreciated that such sequential transactions might will be tied to the dollar amount of the transactions in addition to (or instead of) the number of transactions. For example, a user may be allowed to only perform transactions totaling $25 while out of connection. As noted above, such rules may be embedded within the rules 159. Relatedly, is appreciated that the rules may vary between different transactions scenarios. For example, such rules may vary at the wallet level and/or at the card level. Thus, one type of credit card might have no rules relating to sequential transactions and connectivity vis-à-vis another credit card might be constrained by the illustrative sequential transaction rules described above. Such disparate rules may vary depending on the security associated with a particular card and/or wallet as well as a variety of other attributes associated with the particular payment mechanism. Such rules may be integrally tied to the IA visual presented to the user and/or other icon or visual—so as to advise the user of payment status and ability to perform transactions.

As is also shown in box 1201 of FIG. 12, the IA visual and/or other icon or visual may be tied to the signal strength of the particular communication channel to be used for the requested transaction. For example, the IA visual may be tied to NFC single strength. Accordingly, the IA visual icon 1221 of FIG. 12 would only turn green upon a threshold single strength being determined by the payment IA portion 150, for example. Such single strength may be determined in any suitable manner, such as using the teachings described in U.S. Pub. 2012/0329389 (Royston et al—published on Dec. 27, 2012) which is incorporated by reference herein in its entirety. Accordingly, for example, the payment IA portion 150 may (1) provide the IA visual so as to provide guidance regarding how a user should best position her phone (or other user device) to perform a transaction, i.e., to provide information regarding the connectivity "sweet spot" of the phone, and (2) provide indication of when sufficient signal strength is attained to perform the transaction. Further, it is appreciated that the camera of the phone may be used to assess the best position of a phone vis-à-vis a payment terminal—and to convey such assessment to the user via the IA visual. For example, the payment IA portion 150 may invoke the camera of the phone to turn on and input the observed image to the payment IA portion 150. Hand-in-hand, the payment terminal may be provided to display a particular graphic, such as an "X". Once the payment IA portion observes such graphic (through data comparison of what is actually being observed by the phone versus the image optimally observed by the phone) the payment IA portion 150 conveys such information to the user. For example, the payment IA portion 150 might turn a graphic display "green."

It is appreciated that the IA visual may "point" to an antenna location and/or connectivity sweet spot outside the actual screen of the user device. For example, with a cell phone, the connectivity sweet spot and/or antenna location might be at the very top of the cell phone, so as to be outside the area of the screen (i.e., display) of the cell phone.

It is appreciated that various features are described herein in the context of use with a type of phone. However, such described features may well be used with other user devices as may be desired.

As used herein, information and data are used interchangeably.

Hereinafter, further aspects of implementation of the invention will be described. As described above, FIGS. 1, 2, 8, 10, 11 and 12 show embodiments of a system of the invention. Further, FIGS. 3-7 and 9 show various processing of embodiments of the method of the invention.

The system of the invention or portions of the system of the invention may be in the form of a "processing machine," such as a computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described herein including the processing described in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, RUM Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. An electronic user device that provides an interface assistance visual displayed on the electronic user device to facilitate a communication with a second electronic device, comprising:
   a computer processor;
   a memory portion;
   a plurality of communication elements;
   an electronic visual display; and
   an interface assistance portion executed by the computer processor that performs the following:
      determines a communication element of the plurality of communication elements for communicating with the second electronic device;
      selects the interface assistance visual to display on the electronic visual display that is related to a physical location of the determined communication element in the electronic user device; and
      outputs the interface assistance visual to the electronic visual display of the user electronic device.

2. The user device of claim 1, wherein the user device comprises a smartphone.

3. The user device of claim 1, wherein the plurality of communication elements comprise a plurality of antennas.

4. The user device of claim 3, wherein one of the plurality of antennas comprises a Near Field Communication antenna.

5. The user device of claim 1, wherein the interface assistance visual comprises a bulls-eye graphic showing the location of the determined communication element of the electronic user device.

6. The user device of claim 1 wherein the interface assistance visual comprises at least one graphic and text.

7. The user device of claim 1, wherein the interface assistance visual comprises audio data that is conveyed to the user.

8. The user device of claim 1, wherein the interface assistance visual comprises tactile data that is conveyed to the user.

9. The user device of claim 1, wherein the interface assistance visual is determined based on a type of electronic user device.

10. The user device of claim 8, wherein the interface assistance visual is further determined based on at least one variable parameter associated with the electronic user device.

11. The user device of claim 10, wherein the variable parameters comprise at least one of: a geo location of the electronic user device, an orientation of the electronic user device, an operating system of the electronic user device, a type of the communication, at least one attribute of the second electronic device, and a value of the communication.

12. A method for providing an interface assistance visual to facilitate a communication with a second electronic device for display on an electronic user device a computer processor and a plurality of communication elements comprising:

the computer processor determining a communication element of the plurality of communication elements for communicating with the second electronic device;

selecting the interface assistance visual to display on an electronic visual display of the electronic user device that is related to a physical location of the determined communication element in the electronic user device; and outputting the interface assistance visual to the electronic visual display of the user device.

\* \* \* \* \*